(12) United States Patent
Romine et al.

(10) Patent No.: US 8,639,240 B2
(45) Date of Patent: Jan. 28, 2014

(54) DEVICE MANUFACTURING USING THE DEVICE'S EMBEDDED WIRELESS TECHNOLOGY

(75) Inventors: Christopher Mark Romine, San Diego, CA (US); Dennis Michael Feenaghty, Solana Beach, CA (US); Joseph Patrick Burke, Glenview, IL (US); Sanjay K Jha, San Diego, CA (US); Samir S Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/543,464

(22) Filed: Jul. 6, 2012

(65) Prior Publication Data

US 2012/0276887 A1   Nov. 1, 2012

Related U.S. Application Data

(62) Division of application No. 11/237,373, filed on Sep. 27, 2005.

(51) Int. Cl.
*H04W 24/00*   (2009.01)

(52) U.S. Cl.
USPC ........... 455/423; 455/418; 455/419; 455/420; 455/186.1

(58) Field of Classification Search
USPC ........................ 455/423, 418, 419, 420, 186.1
See application file for complete search history.

(56) References Cited

U.S. PATENT DOCUMENTS 5,491,831 A * 2/1996 Williams et al. ............. 455/66.1
5,894,425 A    4/1999 Saliba
5,974,312 A   10/1999 Hayes, Jr. et al.
6,919,793 B2 * 7/2005 Heinrich et al. ........... 340/10.32
7,024,187 B2   4/2006 Moles et al.
7,149,884 B2  12/2006 Oconnor et al.
7,440,741 B2  10/2008 Comerford et al.

(Continued)

FOREIGN PATENT DOCUMENTS

CN   1269951 A   10/2000
EP   1426870 A2   6/2004

(Continued)

OTHER PUBLICATIONS

International Search Report and Written Opinion—PCT/US2006/037567, International Search Authority—European Patent Office—Jul. 5, 2007.

*Primary Examiner* — Lester Kincaid
*Assistant Examiner* — Mehmood B Khan
(74) *Attorney, Agent, or Firm* — William M. Hooks

(57) ABSTRACT

Embodiments describe manufacturing, programming, testing, and servicing of wireless computing devices utilizing their embedded wireless technology. An embodiment method ensures that the wireless computing devices are successfully programmed in the event a disruption to the manufacturing, programming, testing and servicing process flow occurs. The method includes retrieving a last known location of the wireless device before the disruption event and comparing the last known location with the location of the wireless of the wireless device after the disruption event. A wireless device may be returned to the last known location before the disruption event if there is a difference in locations. The programming at the last known location before the disruption event occurred may be successfully completed. Further embodiments include configuring the manufacturing, programming, testing, and servicing of wireless computing devices utilizing the embedded wireless technology in the device based on a reported location of the device within a facility.

32 Claims, 11 Drawing Sheets

(56) References Cited

U.S. PATENT DOCUMENTS

| | | |
|---|---|---|
| 2002/0099464 A1* | 7/2002 | O'Connor et al. ............ 700/117 |
| 2002/0160717 A1 | 10/2002 | Persson et al. |
| 2002/0183881 A1* | 12/2002 | Wright ........................ 700/115 |
| 2002/0198618 A1* | 12/2002 | Madden et al. ............... 700/101 |
| 2003/0129948 A1 | 7/2003 | Gab et al. |
| 2004/0093109 A1 | 5/2004 | O'Connor et al. |
| 2004/0203930 A1* | 10/2004 | Farchmin et al. ............. 455/457 |
| 2005/0186952 A1 | 8/2005 | Kitajima |
| 2005/0222827 A1 | 10/2005 | Emek et al. |
| 2006/0046717 A1* | 3/2006 | Bovell et al. ................ 455/432.3 |
| 2006/0061482 A1* | 3/2006 | Monney et al. .......... 340/825.52 |
| 2006/0187818 A1 | 8/2006 | Fields et al. |
| 2007/0072599 A1 | 3/2007 | Romine et al. |

FOREIGN PATENT DOCUMENTS

| | | |
|---|---|---|
| JP | 2001510315 | 7/2001 |
| JP | 2005157637 | 6/2005 |
| JP | 2005202594 | 7/2005 |

* cited by examiner

DEVICE MANUFACTURING USING THE DEVICE'S EMBEDDED WIRELESS TECHNOLOGY

RELATED APPLICATIONS

This application is a divisional application of and claims priority to U.S. patent application Ser. No. 11/237,373, titled "Device manufacturing using the device's embedded wireless technology" (filed Sep. 27, 2005 and published as U.S. Published Patent Application No. 2007/0072599 on Mar. 29, 2007), the entire contents of which are hereby incorporated by reference.

BACKGROUND

1. Field

The following description relates generally to wireless devices and more particularly to facilitating efficient manufacturing, programming, testing, and servicing of wireless devices utilizing the device's embedded wireless technology.

2. Background

Wireless computing device manufacturing conversion costs are a significant portion of the total cost of the device. The manufacturing process, regardless of technology, consists of various stages or processes and the devices are transported from one stage to another utilizing human (or robotic) labor. At each stage or process there is at least one physical connection or data interface needed to test, program, and/or transfer data to/from the device(s)—these physical connections allow the device to communicate with a tester, controller, programmer, etc.

The hardware (e.g., cabling, connectors) utilized in wired data transfer solutions to physically connect the data interfaces contribute to the overall cost of manufacturing the devices. In addition, there are costs associated with servicing, preventive maintenance, and repair of test fixtures to maintain the units in proper working condition.

Test fixtures utilized to support multiple devices also contribute to hardware and maintenance costs. Multiple data ports in a tester controller PC are used for data transfers to multiple wireless devices. However, there is a physical limitation to the number of data ports supported in a test controller PC. Hubs and routers are often used to connect to multiple devices, but the total bandwidth is shared across the wireless devices being processed.

There is also a significant amount of handling (human labor) required to connect and disconnect the device to/from the tester, controller, programmer, etc. A large influence on costs is the long test times relative to downloading data, handling, and physical movement of devices. Therefore, even a slight reduction in assembly process time and/or handling decreases cost of each device and can amount to significant savings when calculated over the vast number of devices manufactured.

SUMMARY

The following presents a simplified summary of one or more embodiments in order to provide a basic understanding of some aspects of such embodiments. This summary is not an extensive overview of the one or more embodiments, and is intended to neither identify key or critical elements of the embodiments nor delineate the scope of such embodiments. Its sole purpose is to present some concepts of the described embodiments in a simplified form as a prelude to the more detailed description that is presented later.

According to an embodiment, a method utilizes embedded wireless technology already supported by a device being tested to transfer data to and from factory test controllers without use of physical data connections. Wireless Universal Serial Bus (WUSB), for example, supports high rate data transfers (about 480 Mbps) at low transmit power levels in unlicensed spectrum. Other embedded wireless technologies such as Bluetooth, 802.11x (WiFi), etc., can also be utilized including other radio technologies that operate in licensed spectrum (e.g., CDMA and GSM). Wireless data transfers reduce test fixture and cabling costs, both initial and long-term maintenance.

According to another feature are data transfers that can be broadcast to multiple phones enabling processing of a plurality of devices in parallel, effectively decreasing processing time, and lowering conversion costs. Testing and data transfer processes can be initiated and concluded automatically as wireless devices transfer in and out of a range of a test controller, mitigating operator intervention and reducing overall processing time.

According to another embodiment is a method of programming wireless devices in a manufacturing environment—the method includes sending program data to at least one wireless device though a wireless communication. The program data is received at the at least one wireless device which is then programmed with the received data.

According to another aspect the program data included in the wireless communication is received at a plurality of other wireless devices at a substantially similar time as received at the at least one wireless device and the plurality of other wireless devices are programmed at about the same time as the at least one wireless device. The wireless communication is one of Bluetooth, WiFi, Wireless USB, Code-Division Multiple Access (CDMA), wide-band CDMA (WCDMA), Global Systems for Mobile Communication (GSM), enhanced data GSM environment (EDGE), WiMAX or IEEE 802.16 standard, and Global Positioning System (GPS) format, for example.

According to another aspect is a method of testing a plurality of wireless computing devices. The method includes locating a plurality of wireless computing devices in a manufacturing process, sending a wireless test signal to the plurality of wireless computing devices, and processing the wireless test signal at each of the wireless computing devices at substantially the same time. The method can further include testing the wireless devices as a batch of devices. A unique identifier can be assigned to each of the wireless devices and the devices can be distinguished based at least in part on the unique identifier. According to another embodiment, a location of each of the plurality of wireless devices can be determined based upon a manufacturing process and a subset of the devices can be grouped based at least in part on the determined manufacturing process. According to another embodiment, data communication can begin automatically when each device of the wireless devices enters a signal range. The data communication can end automatically when each device exits a signal range.

According to still another embodiment is a method for facilitating wireless testing and programming of wireless devices. The method includes establishing communication between a control unit and a wireless device, receiving information at the wireless device from the control unit, and transmitting response information to the control unit from the wireless device. According to another aspect, the method can include updating a processor of the wireless device with the received information and storing the received information in a memory of the wireless device. According to yet another aspect, the method can include concurrently sending a wireless test signal to a plurality of wireless devices, processing the wireless test signal at the wireless devices in parallel, and receiving respective test result signals from each of the devices—the plurality of wireless devices can be in different manufacturing areas.

According to a further embodiment is a system that includes a plurality of wireless devices configured to communicate wirelessly and at least one control unit configured to interface wirelessly with the plurality of wireless devices during at least one manufacturing process. The plurality of wireless devices and the at least one control unit communicate in a format supported by an embedded wireless technology of the plurality of wireless devices. The at least one manufacturing process is one of a flash, RF calibration, call test, MMI test, audio test, antenna test and provisioning and customization.

According to yet another embodiment is a wireless device that includes a component that receives program data wirelessly during a manufacturing, testing, or servicing process. The wireless device further includes a memory that stores the program data and a processor memory that is programmed with the program data. The wireless device is configured to receive the program data utilizing one of Bluetooth, WiFi, Wireless USB, Code-Division Multiple Access (CDMA), wide-band CDMA (WCDMA), Global System for Mobile Communication (GSM), enhanced data GSM environment (EDGE), WiMAX or IEEE 802.16 standard, and Global Positioning System (GPS) format, for example.

Still another embodiment is a computer readable medium having stored thereon computer executable instructions for receiving program data during a manufacturing or testing process and programming at least one wireless device using the received program data. The medium can further include instructions for receiving a test sequence, performing the test sequence, and outputting a wireless signal that includes a test result.

According to a further embodiment, is a processor that executes instructions for wireless testing and programming during a manufacturing process. The instructions include receiving program data through a wireless communication. The received program data is stored in a cache and the processor is programmed with the program data.

To the accomplishment of the foregoing and related ends, one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
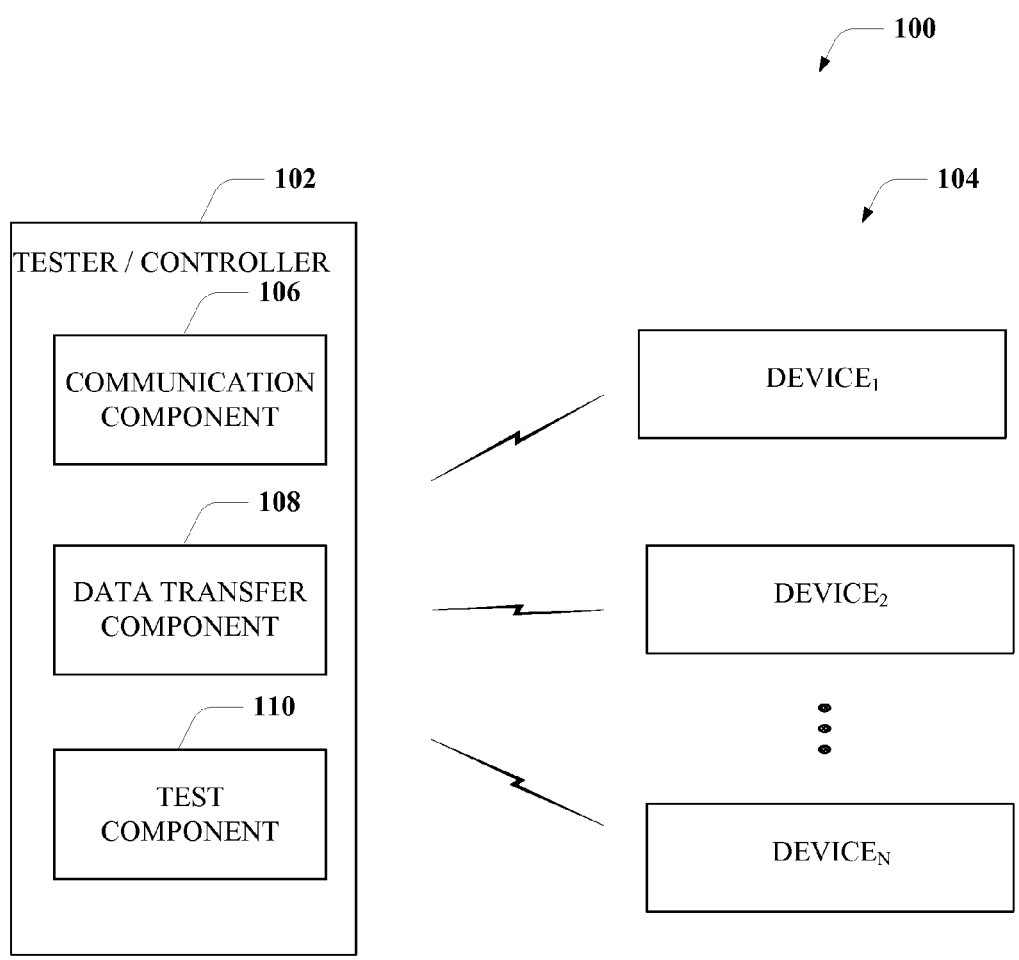
FIG. 1 is a block diagram of a system that facilitates efficient manufacturing and testing of wireless computing devices utilizing wireless technology.

With reference now to the drawings, FIG. 1 illustrates a system 100 that facilitates wireless testing and/or transfer of data to a wireless device (and associated subcomponents) during device manufacturing, configuration, programming, and/or testing, including reliability and quality assurance processes. System 100 includes a tester/controller 102 that is configured to test a plurality of components or parts of one or more devices, shown as Device.sub.1, Device.sub.2, through Device.sub.N, and referred to collectively as wireless devices 104. Wireless devices 104 can be a portable device or terminal, a portable (mobile) phone, a personal data assistant, a personal computer (desktop or laptop), or other electronic and/or communication devices that communicate wirelessly.

It is to be understood that while one tester/controller 102 is illustrated, there may be more than one tester/controller 102 and each can be located in one of a plurality of locations in a manufacturing environment to facilitate data transfer, configuration, and/or testing of wireless devices 104. Distributing tester(s)/controller(s) 102 in various locations facilitates automatic testing and/or programming of wireless devices 104. Such testing and/or programming is coordinated by the movement of wireless device(s) 104 throughout the facility. The testing/programming start time is associated with the wireless device(s) 104 entering a wireless range of tester/controller 102, while an end time is associated with the wireless device(s) 104 leaving the range of tester/controller 102.

If a wireless device's 104 embedded wireless technology is not utilized, tester/controller 102 is physically connected to wireless device 104 through, for example, a manual connection at an I/O port or connector to transmit data to/from wireless device 104. This involves the physical transport of wireless device 104 and physical connection of data interfaces utilizing human (or robotic) intervention and labor. Tester/controller 102 of system 100 is capable of overcoming the above physical limitations and is configured to communicate wirelessly to wireless device 104, utilizing a wide variety of wireless technologies. For example, a wireless universal serial bus (WUSB) supports high rate data transfers (about 480 Mbps) at low transmit power levels in unlicensed spectrum. Other embedded technologies, such as Bluetooth or WiFi (802.11x) can be utilized. In addition or alternatively, radio technologies that operate in the licensed spectrum (e.g., CDMA, GSM) can be utilized. CDMA (Code-Division Multiple Access) is a digital cellular technology that uses spread-spectrum techniques and GSM is a global system for mobile communication.

As illustrated, tester/controller 102 can include a communication component 106, a data transfer component 108, and/or a test component 110 configured to interface with one or more wireless devices 104. In addition, tester/controller 102 can be configured to communicate through a hardwired connection. It is to be understood that while a tester/controller 102 having these components is illustrated, the separate components can be in different test/controllers located in a plurality of locations (e.g., throughout a warehouse, assembly area, office, service center, . . . ) depending on the tasks to be performed and the type of wireless communication desired. For example, test component 110 can be located in a reliability or quality assurance area while data transfer component 108 can be located in a manufacturing area. In addition, tester/controller 102 can be located in a customer service center to provide efficient software upgrades for customers while mitigating the necessity of a physical connection to the device. Thus, the disclosed technologies can be utilized after the manufacturing process is complete and wireless device(s) 104 are in service.

Communication component 106 is configured to facilitate communicating to/from wireless devices 104 and facilitate determining, obtaining, receiving, or inferring parameters associated with wireless device(s) 104. For example, communication component 106 can be configured to facilitating locating wireless device 104 and associate such location information with a manufacturing/testing stage or process. The communication component 106 can facilitate the proper communication (e.g., data transfer, testing, programming, configuration, . . . ) necessary for such wireless device 104 and mitigate redundant testing and/or transfer of data. Communication component 106 can further facilitate configuring wireless device 104 and/or controlling process flow.

Data transfer component 108 is configured to transfer data to and extract data from wireless device(s) 104. As the consumer and/or operator demands more data to be available, the memory size of wireless device(s) 104 is correspondingly increased as well as the amount of data that is loaded onto the wireless device(s) 104 during the manufacturing, servicing, provisioning, and/or customization processes. Some data may be standard while other data may be unique or configured for one wireless device 104, or a subset of such wireless devices 104 due to customized specifications (e.g., carrier, customer).

Tester/controller 102 can include test component 110 configured to test the functionalities and/or performance of wireless device(s) 104 or subcomponents (board, etc.) of wireless devices 104. Test component 110 can facilitate obtaining, receiving, querying, etc. for wireless device 104 information and can be further configured to record, maintain, and/or store such information. This information can be utilized for further analysis purposes. For example, wireless device information can be utilized to facilitate warranty repairs and/or servicing of the device during consumer use, in the event that such warranty and/or service is necessary.

Figure 2:
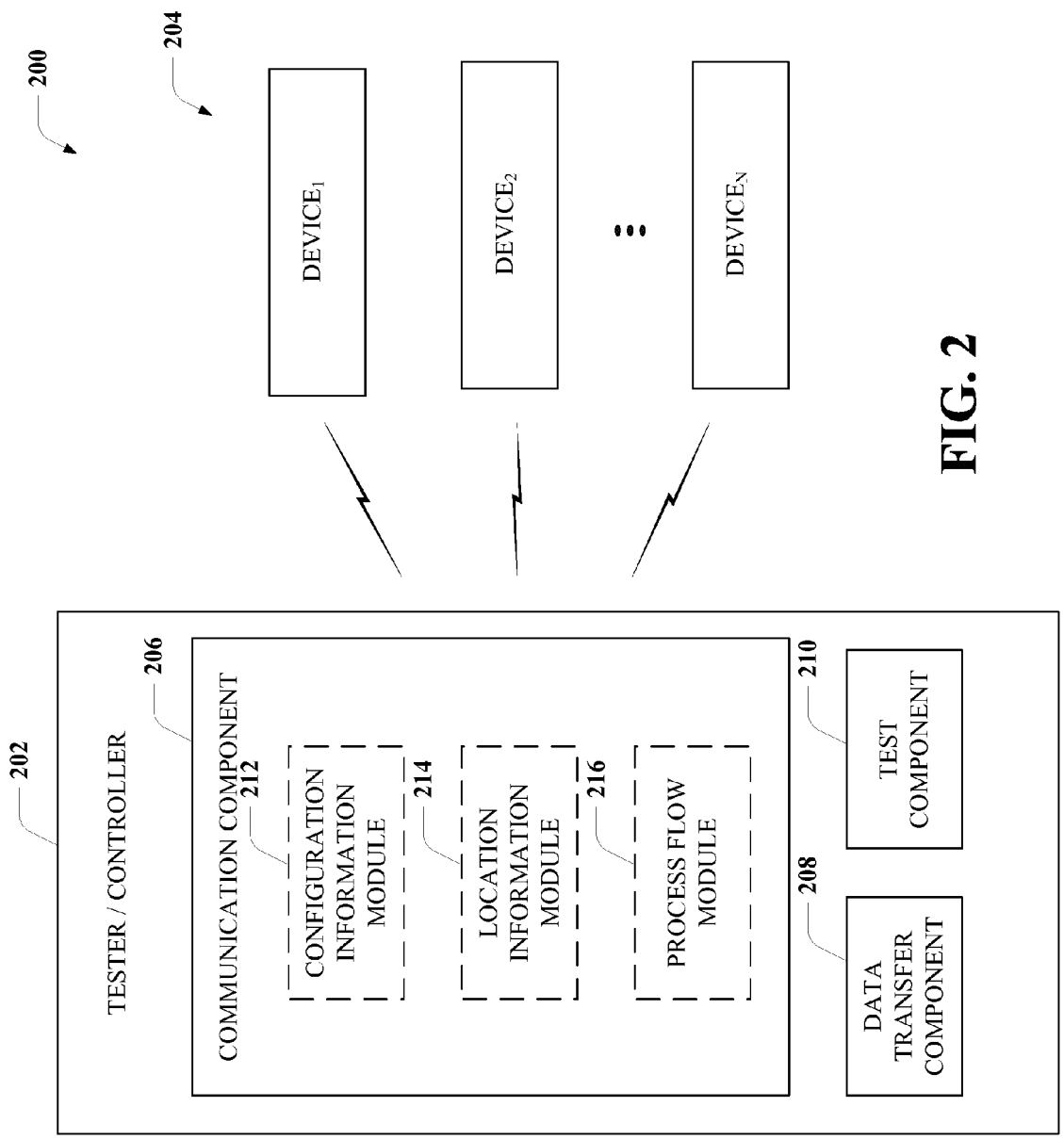
FIG. 2 illustrates a system that utilizes a communication component to facilitate efficient wireless device manufacturing.

With reference now to FIG. 2, illustrated is a system 200 that utilizes a communication component to facilitate device manufacturing. Tester/controller 202 can include a communication component 206 that has various modules for interacting with one or more wireless devices 204 during manufacturing, testing, and/or programming processes. It is to be appreciated that communication component 206 can be a component separate from tester/controller 202. Communication component 206 can include a configuration information module 212, a location information module 214, a process flow module 216, and/or any combination thereof. Modules 212, 214, 216 interface with each other and with a data transfer component 208 and a test component 210.

Configuration information module 212 is configured to communicate wirelessly with a plurality of wireless devices, referred to collectively as 204. A wireless signal is sent to the plurality of devices 204 and, based upon a response to such signal, the configuration information module 212 can facilitate determination of parameters associated with such device(s) 204 and/or if further parameters should be associated with device(s) 204. For example, through utilization of configuration information module 212 a determination can be made whether a particular device 204 has been programmed with certain data, mitigating the sending of redundant data while ensuring the device has the correct and/or complete data.

Newly assembled devices might be programmed with a generic identifier through a wired means, for example. This generic identifier can be utilized by configuration information module 212 to provide a unique identifier to each wireless device 204. The unique identifier can be associated with device 204 early in the manufacturing process, such as at the component level, or at other manufacturing stages. A batch or large number of components associated with wireless device(s) 204 can be given a unique identifier during a boot process. The components can be given such identifier information wirelessly through an interface with configuration information module 212. The assigned unique identifier can be utilized in later processes to identify a particular wireless device 204.

Bluetooth is an example of a technology that may be utilized to facilitate efficient device manufacturing. Bluetooth is an open global standard for short-range communication. Bluetooth is a Radio Frequency (RF) specification for short-range, point to multi-point voice and data transfers. It has a nominal link range from about 10 centimeters to about 10 meters and by increasing the transmit power can be extended to about 100 meters. Since there is a particular range through which it is broadcast, there is a smaller subset of devices that receive the signal. Therefore, there is not a substantial necessity for differentiation and/or coding of the devices because of the small number of devices in the range or zone.

For example, during some manufacturing processes the devices are in an RF shielded enclosure. While in this enclosure, the devices can be provided a unique identification allowing the device to be recognized during later manufacturing stages. These unique identifiers can categorize the device for a certain data set or customization process. This also allows a group of devices to be programmed with one identifier that can be used to support a broadcast mode later in the process. By way of example and not limitation, some devices, such as portable phones are provided an electronic serial number (ESN) or some type of identification. An ESN is a unique identification number associated with each portable phone and can be assigned by a specific portable phone manufacturer. The ESN is embedded within a signal transmitted by the portable phone. Alternatively or in addition, during the manufacturing process an ultra wide band (UWB) identifier can be associated with each device 204. Thus, allowing each device 204 to be identified, offline with the ESN identifier and/or the UWB identifier. When the device 204 is located in a later processing stage, it can be matched to a serial number, for example, facilitating distinguishing the device 204 for customizing and/or provisioning purposes. Thus, with such unique identifiers each device 204 can be mapped to facilitate programming of the correct data.

Batch processing of device(s) 204 mitigates the necessity for each device to be manually transported and connected to a test component for testing and/or programming. After wired testing and/or programming such device(s) 204, are manually disconnected and removed from tester/controller 202 and placed in a proper location (e.g., on a reel, in a bin) for transport to the next manufacturing process or stage. During wireless batch processing, devices 204 in that batch, lot, or shipment are programmed and/or tested at substantially the same time, or in parallel without the need to physically connect the devices 204. For example, in a broadcast mode where, for example, Wireless USB is utilized and about 480 Mbps of data can be transferred, a plurality of wireless devices can be programmed and/or tested at substantially the same time. Batch processing or processing in parallel decreases total processing time and lowers associated manufacturing costs.

With continuing reference to FIG. 2, location information module 214 is configured to facilitate determining the location of device(s) 204 in the manufacturing, programming, and/or testing areas. The device(s) location can be determined by wirelessly receiving a device's unique identifier and associating the device 204 with the received identifier. If there is more than one tester/controller 202 in the facility, the location of each device 204 can be further ascertained by determining which tester/controller 202 received the device's 204 information. With this location information, the location module 214 can facilitate generation of reports, queries, etc. relating to the efficiency of the process as well as ensuring that a manufacturing, testing, programming process is not overlooked and/or skipped during automated device processing.

For example, there may be a disruption in a device process flow due to a variety of planned and/or unplanned events (e.g., power failure). During such an event, product or devices 204 located on a rack or in a box may be inadvertently moved by personnel to clear a passage or aisle. When the event is over, the location information module 214 can retrieve the last known location of the particular device(s) 204 based at least in part on previously received and/or obtained data. The last known device location can be compared with the device location after the event and the differences ascertained. In such a way, the location information module 214 can provide information after the event regarding whether device 204 should be returned to a previous (or last known) location or process. With interaction from the configuration information module 212, it can further be determined if the device(s) 204 has successfully completed the process at the previous or last known location. Thus, redundant and/or overlooked processes and/or data transfer operations is further mitigated.

Process flow module 216 can facilitate removal of device(s) 204 that exhibit failure, intermittent operation, are defective or nonconforming, or exhibit other unreliable operation. If such a device condition is determined by data transfer component 208 and/or test component 210, process flow module 216 can identify such device 204 through its unique identifier, for example, and isolate and/or mark such device 204 to be removed from the process without affecting other devices 204 that do not exhibit such characteristics. The device 204 can be removed from the process to be repaired, returned to a supplier for failure analysis, or scrapped. It should be appreciated that a batch or shipment of components or devices 204 (e.g., from a supplier) can be identified by the process flow module 216, and if warranted, the entire batch or shipment can be isolated and/or removed from the process for additional testing, repair, etc. Thus, a parameter other than a unique identifier can be associated with device(s) 204 to facilitate identification of device(s) 204 both individually and in association with other device(s) 204 in the same lot, batch, manufacturing process, etc.

Figure 3:
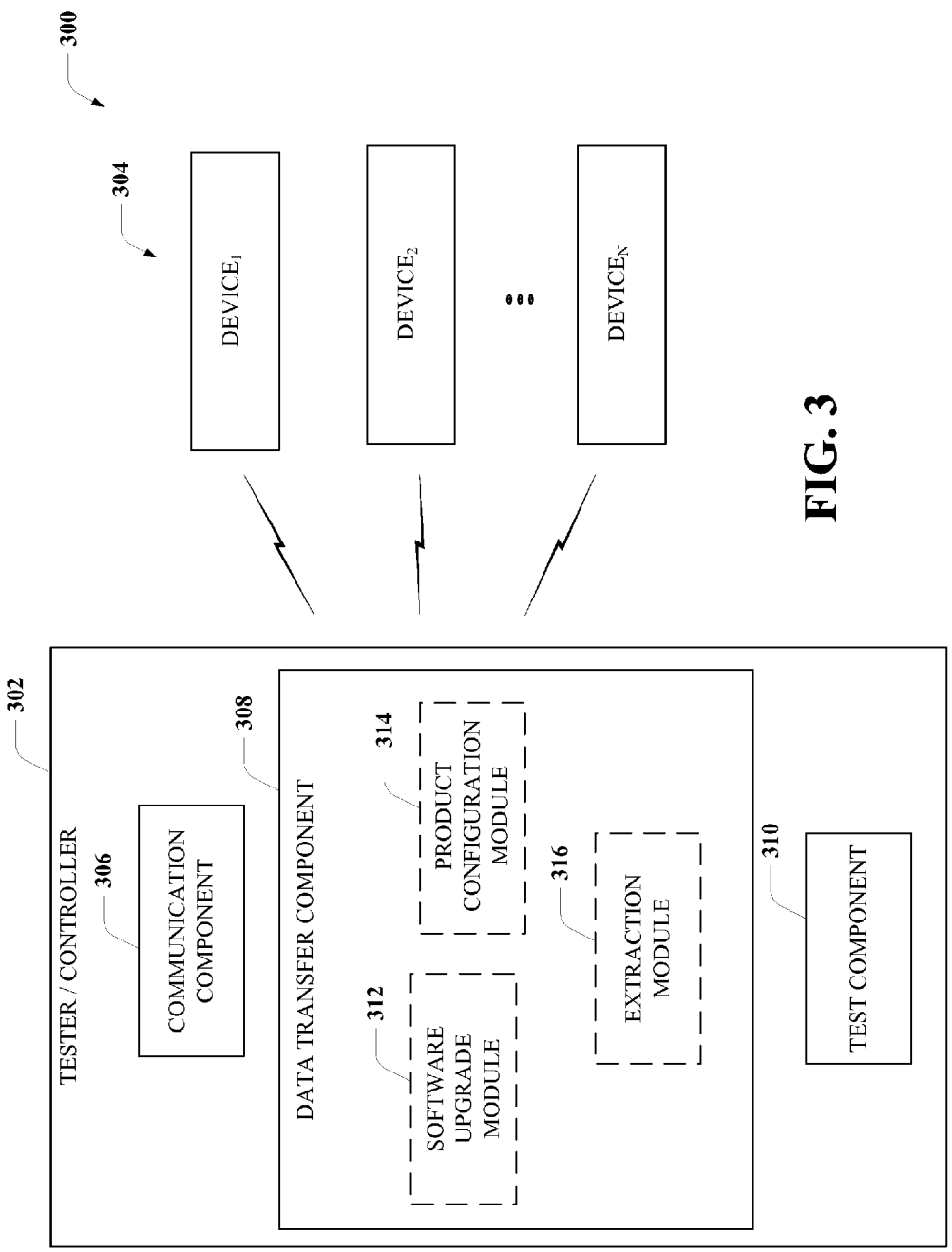
FIG. 3 illustrates a system that utilizes a data transfer component to facilitate programming information to and extracting data from a wireless computing device.

FIG. 3 illustrates a system that utilizes a data transfer component to facilitate programming information to and extracting information from a plurality of wireless computing devices, referred to collectively as 304. Data transfer component 308 can include modules such as a software upgrade module 312, a product configuration module 314, and/or an extraction module 316. The modules 312, 314, 316 of the data transfer component 308 interface with each other and with a communication component 306 and/or a test component 310. It is to be understood that data transfer component 308 and/or associated modules can be located remotely from tester/controller 302. It is to be further understood that more or less modules can be associated with tester/controller 302 and all such modifications or alterations fall within the scope of this disclosure.

Software upgrade module 312 is configured to facilitate transfer of software and/or software upgrades to one or more wireless devices 304 through wireless communication. Software upgrades can include standard software that is to be programmed on every wireless device 304. Such upgrades can be performed to a batch of devices 304 at a substantially similar time. In addition or alternatively, software may be intended for a subset of devices 304 while another subset of devices 304 is to receive other software. According to another aspect, one wireless device 304 might be individually programmed with software. The software upgrade module 312 can perform software programming to both subsets of devices in parallel. That is to say, the software upgrade module 312 can program two or more subsets of devices 304 with at least two different software programs at a substantially similar time. This can be performed through utilization of each device's 304 unique identifier or other parameters associated with the subset of devices 304. Parallel or batch processing increases efficiency and reduces overall manufacturing time and associated costs.

Product configuration module 314 can facilitate configuration of device(s) 304 with data specific to such device(s) 304. This data can be files that are typically downloaded at a provisioning, customization and/or configuration process, which is usually one of the last stages of the manufacturing process. During such a process, parameters that allow device(s) 304 to operate on a specific network or carrier can be downloaded wirelessly and stored in the device(s) 304. The provisioning can include potentially large data transfers such as customization for a user interface (UI), sample video, still image files, language translators, and other data files. The product configuration module 314, through wireless communication, identifies the particular device 304 that is to receive the custom files and transfers the appropriate files to that device 304.

Extraction module 316 is configured to extract or read information from at least one wireless device 304. Information that can be extracted from a wireless device includes a unique identifier, if one is associated with device 304, as well as other data associated with device 304. The data might be obtained by extraction module 316 to determine what is loaded on device 304 and to ensure that the information is correct in content, version, and/or revision.

Figure 4:
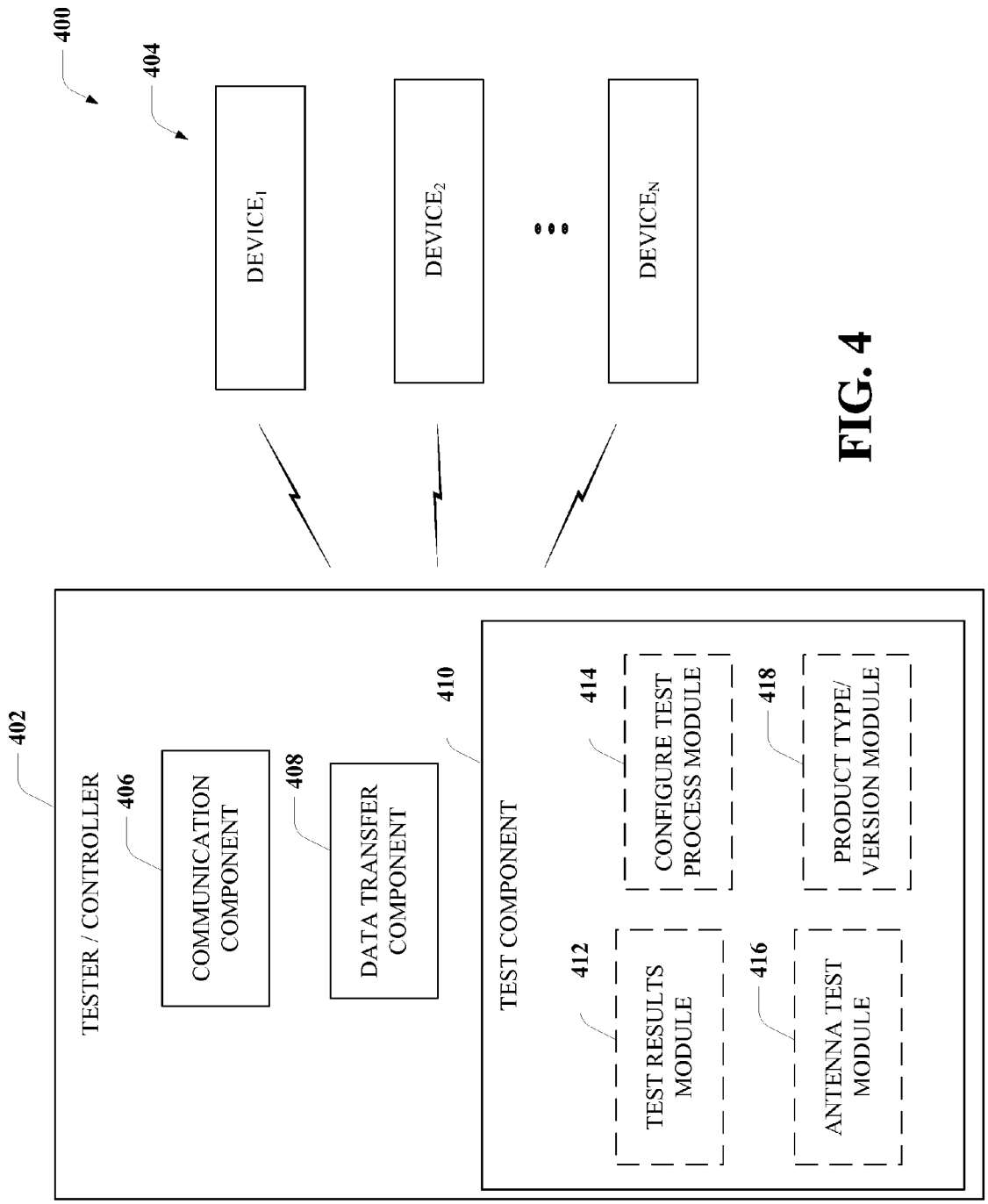
FIG. 4 illustrates a system that utilizes a test component that facilitates testing of a plurality of parameters of a wireless computing device utilizing wireless technology.

FIG. 4 illustrates a system 400 that utilizes a test component that facilitates testing a plurality of parameters of wireless computing device(s) 404 through utilization of wireless technology. Test component 410 can include a test results module 412, a configure test process module 414, an antenna test module 416, and/or a product type/version module 418. These modules 412, 414, 416, 418 interface with each other and with a communication component 406 and/or a data transfer component 408 located in the same or separate tester/controller 402. It is to be understood that the test component 410 and/or tester/controller 402 is not limited to the modules described and more or less modules can be utilized and all such modifications are intended to fall within the scope of the subject disclosure and appended claims.

Test results module 412 is configured to receive, obtain, record, and/or query information relating to a plurality of test parameters of wireless computing device(s) 404. The device(s) 404 can be tested individually, in batch, and/or in parallel. Batch testing and parallel testing allow a plurality of devices 404 to be tested at substantially the same time. For example, a plurality of devices 404 can receive and/or send communication information in some wireless networks. Batch testing facilitates testing the plurality of devices for similar test parameters. Parallel testing facilitates testing different parameters associated with the plurality of devices 404 at a substantially similar time. Test results module 412 is configured to differentiate between the plurality of devices 404 and the tested parameter for each device 404.

Configure test process module 414 is configured to test a plurality of devices 404 and configure the test based upon the different parameters associated with each of the plurality of devices 404. For example, based upon a response received from the plurality of devices 404, the configure test process module 414 can automatically configure the test process and test selection for different product types and/or versions of the plurality of devices 404. It is to be understood that the test process can include wirelessly transmitting a test sequence to be performed at the plurality of device 404.

Antenna test module 416 is configured to provide a wireless signal to the devices 404 and determine if each device's 404 antenna (not shown) is operating properly. It is possible to avoid adversely influencing test results by wirelessly transferring data to/from the device, as hard wiring to the device can effectively extend the ground plane of the antenna. Antenna test module 416 can also facilitate measuring a coverage range of the particular antenna. For example, antenna test component 416 can be located in a particular section, department, and/or area of a manufacturing environment. Based upon the location of a wireless computing device 404, it can be tested to ascertain if the device's antenna is operating properly and the range of the antenna. If a particular wireless computing device 404 is known to be at the edge of a particular area, the antenna test module 416 can locate such device 404 and, based upon such location, determine the range of such antenna, and its capability to both send and receive information.

Product type/version module 418 obtains information specific to a wireless computing device 404. A plurality of wireless computing devices 404 can be assembled together as a subset of devices for programming and/or testing that is different from another subset of wireless computing devices. Each subset can be identified by a unique identifier and/or other parameter information. This facilitates performing appropriate programming and/or testing on each subset of devices. It is to be understood that one or more of the elements can be combined or there can be additional elements than those shown and described.

Referring to FIGS. 5-8, methodologies that facilitate efficient device manufacturing test utilizing the device's embedded wireless technology are illustrated. While, for purposes of simplicity of explanation, the methodologies are shown and described as a series of acts, it is to be understood and appreciated that the methodologies are not limited by the order of acts, as some acts may, in accordance with these methodologies, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement the following methodologies.

Figure 5:
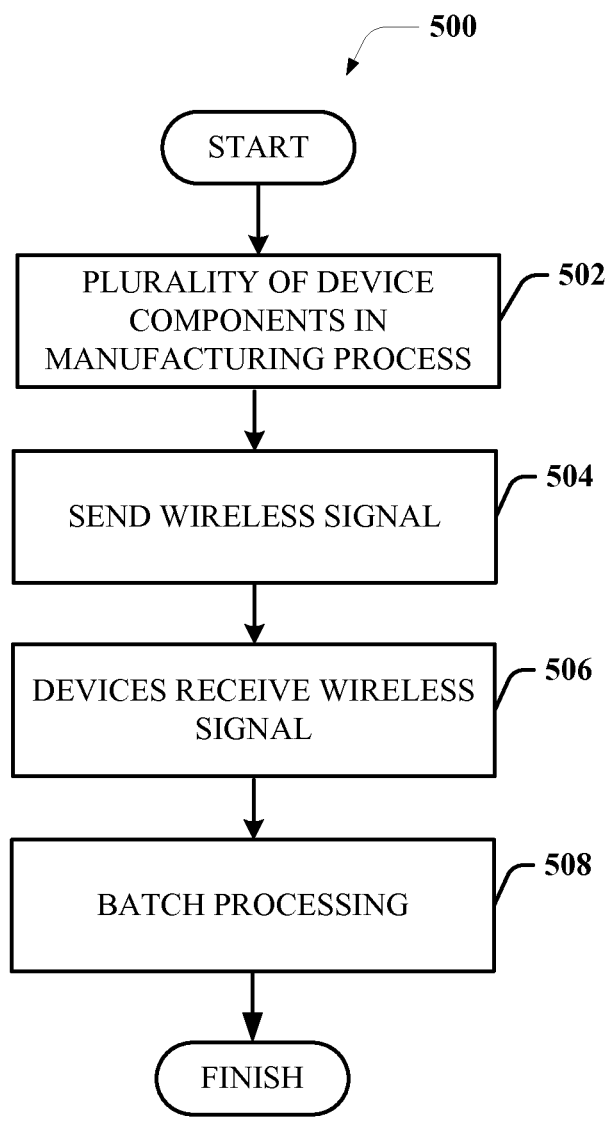
FIG. 5 illustrates a flow diagram of a methodology for batch processing of devices during a manufacturing process.

FIG. 5 illustrates a flow chart of a methodology 500 for batch processing of devices during a manufacturing process. Generally, an initial stage of a manufacturing process involves loading of boot code on a component of a wireless memory device. Memory devices are typically preprogrammed with a general fixed image that each device receives without regard to later customization that might be programmed into the device. The fixed image is usually programmed at the component level before the part is loaded on a board.

Figure 6:
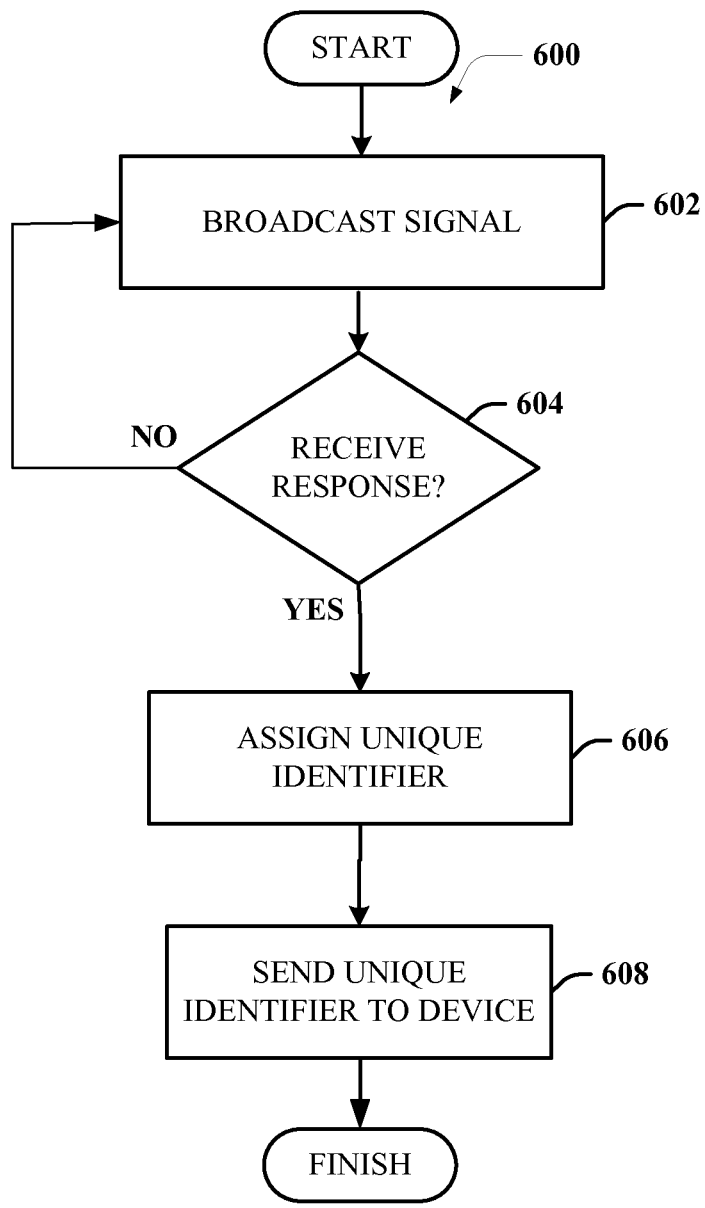
FIG. 6 illustrates a flow diagram of a methodology for associating a unique identifier to a device during a manufacturing process.

FIG. 6 illustrates is a flow diagram of a methodology 600 for associating a unique identifier to a device during a manufacturing process. In certain manufacturing processes, the devices can be in an enclosure, such as an RF shielded enclosure. Since there are a limited number of devices in the enclosure at a time, each device can be given a unique identifier that facilitates recognition of the devices later, either during the manufacturing process or after the devices are in service. For example, the unique identifier can categorize the device for a particular material or operator and, based on the unique identifier, a tester/controller can provision the device to its particular configuration(s). The unique identifier can further be matched with an ESN identifier, UWB identifier, or other type of identifier, facilitating mapping the device with the correct data.

The method starts, at 602, when a signal is broadcast from a manufacturing unit, such as a tester/controller. A wireless technology, such as Bluetooth, can be utilized to facilitate association of the device with the unique identifier. A determination is made, at 604, whether a wireless device has responded to the signal. If there is no response received, or if the received responses are from devices that have been previously associated with a unique identifier, the method returns to 602 where another signal is broadcast. If there is a response received at 604, a unique identifier is assigned to the wireless device at 606. The unique identifier is sent to the device, at 608, and allows for identification of the wireless device at a later manufacturing operation and/or after the device is placed into the field of commerce (e.g., consumer is using the device).

Figure 7:
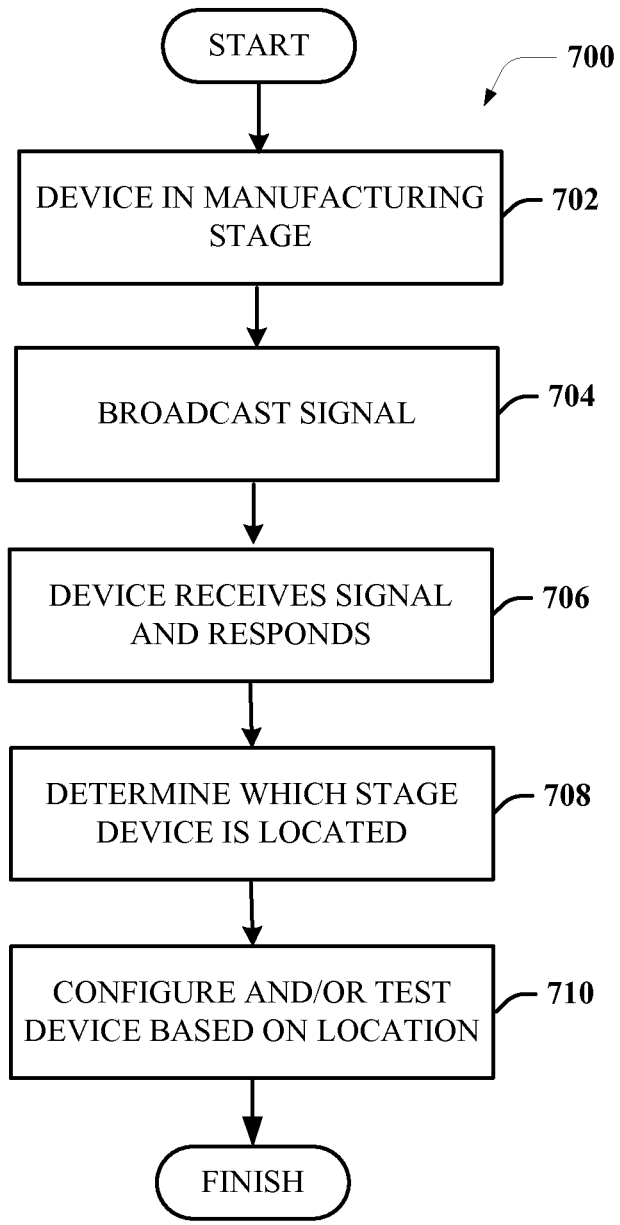
FIG. 7 is a flow chart of a methodology for wirelessly configuring and/or testing a wireless device in a manufacturing environment.

With reference to FIG. 7, illustrated is a flow chart of a methodology 700 for wirelessly configuring and/or testing a wireless device in a manufacturing environment. The method starts, at 702, where a plurality of devices are in a variety of manufacturing stages. Generally, stages of manufacturing can be divided into processes or locations. These stages can include, for example, boot and flash, RF calibration, call test, man-machine interface (MMI) or user interface (UI) test, audio test, antenna test, and/or provisioning and customization. It is to be understood that these manufacturing, programming, and/or testing stages are provided for illustration purposes only and other stages can be included as well as multiple stages combined into one stage.

A signal is sent to the plurality of devices, at 704. The signal can be various technologies including wireless USB that supports high rate data transfers (about 480 Mbps) at low transmit power levels in unlicensed spectrum. Other embedded wireless technologies such as Bluetooth, 802.11x (WiFi), etc., can also be utilized including other radio technologies that operate in licensed spectrum (e.g., CDMA and GSM). The signal can be specific to a particular manufacturing stage and/or device or it might be broadcast to the devices within the signal range.

When one or more device(s) receives the signal, the device(s) can respond to such signal at 706. Such response can include specific device information, a unique identifier, signal received notification, device data information, etc. Based on the received signal the location or manufacturing stage in which the device is located can be determined at 708. For example, there may be more than one unit (tester or controller) in the facility that sends and receives signals to/from a plurality of devices. Based on the devices that responded, at 706, the unit receiving the signal identifies the device and confirms that the device is in the signal range of the unit. The device can also respond with test results or other information requested by the tester or controller. Based upon the devices that responded, the location of each device in the process flow can be determined and the appropriate configuration and/or testing of such devices is conducted, at 710.

Figure 8:
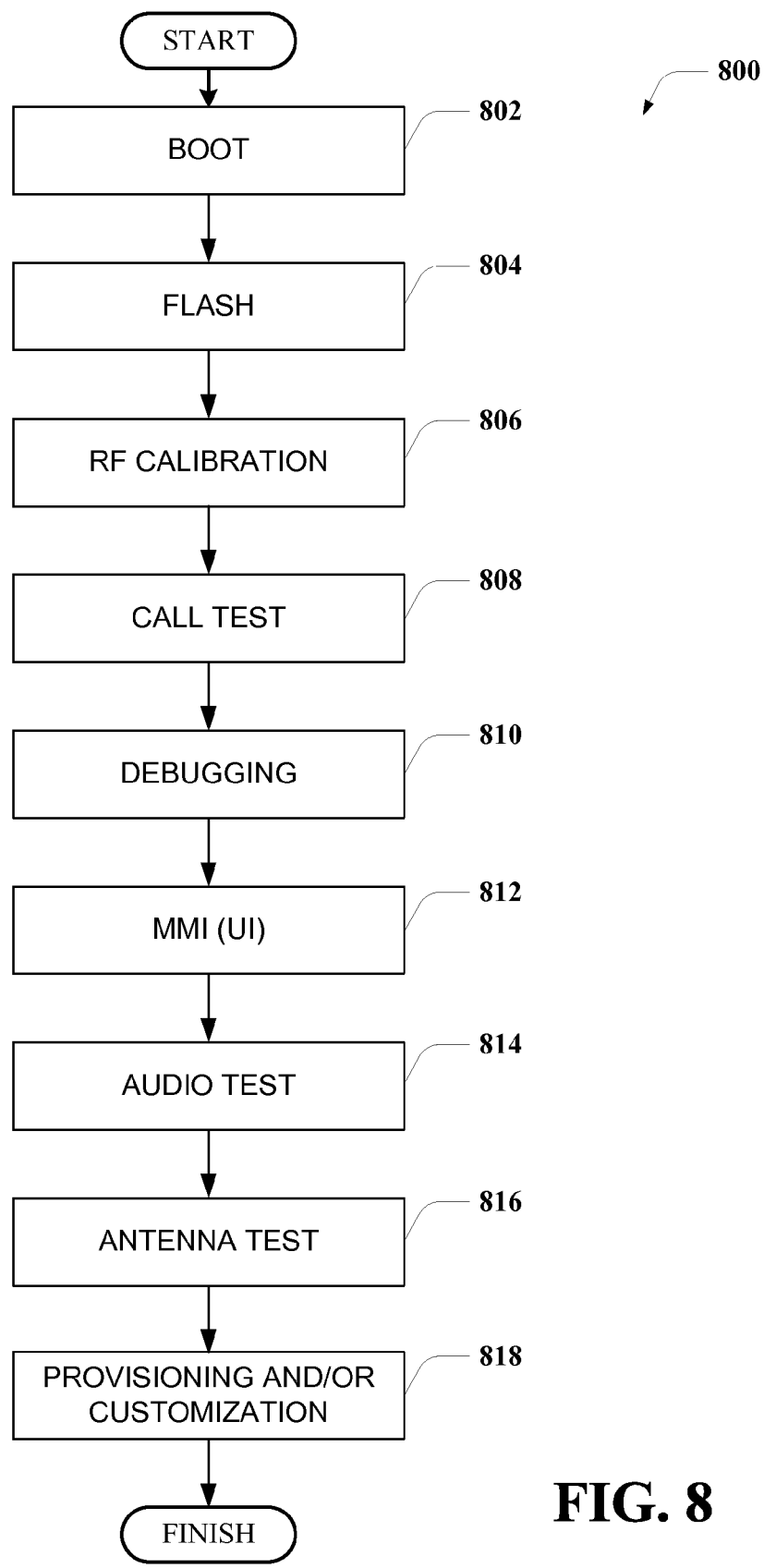
FIG. 8 illustrates a flow chart of exemplary manufacturing process that can utilize the disclosed systems and/or methods to test and/or program devices in parallel.

FIG. 8 illustrates a flow chart 800 of exemplary manufacturing processes that can utilize the disclosed systems and/or methods to test and/or program devices in parallel. While the processes are shown in a particular order, it is to be understood that such processes can be in a different order. In addition, there may be less or additional processes that can utilize wireless technology and all such modifications and/or alterations are intended to fall within the scope of the subject disclosure and appended claims. It is also to be appreciated that these exemplary processes can be performed in parallel or at a substantially similar time, reducing manufacturing time and increasing productivity and throughput. The devices can also be batched for more efficient programming and/or testing.

A preliminary stage of a manufacturing process can be boot process, at 802, and/or a flash download, at 804, where the devices receive or are programmed with the same Flash image. These can be component level processes and can be performed on a batch of components, or parts of a wireless device, at a substantially similar time utilizing wireless technology. By utilizing the wireless capacity of the device and/or its components, the necessity of physically attaching or interfacing a wired connection to such component is mitigated and/or eliminated.

RF calibration, at 806, and call test, at 808, or unit conducted test are performed at a board testing level and/or at a phone level test process. Calibration of a wireless computing device can be efficiently performed utilizing one or more of the systems and/or methods disclosed herein. During RF calibration, data is obtained from the device and processed allowing more specific data to be written to the device. The call test can facilitate information processing of the response of a wireless device to such a call. In such a way, if either the RF calibration 806 or call test 808 fails (e.g., if the wireless device does not respond or responds in an incorrect manner) the device can be removed from the manufacturing process and marked as "non-conforming" and sent to reliability testing, returned to the supplier, scrapped, and/or disassembled to allow its subcomponents to be utilized in a different device. In addition, the device can be sent to a debug process, at 810. The debug process can mitigate or eliminate potential problems with the device during the manufacturing process.

Phone level testing processes include man-machine interface (MMI) or user interface (UI) testing at 812. This test is conducted to ensure that the device is operative and can interact with a user. Other phone level testing procedures include, audio testing at 814 and/or antenna test at 816. Audio testing 814 measures audio frequency response of input/output audio transducers. Antenna testing 816 can ensure that the device antenna is able to receive a signal and can include testing for a signal range.

Provisioning and/or customization 818 are at the carrier or customer customization level. In this process, certain parameters can be stored in the device that allow the device to operate on a certain network, for example. The provisioning can include potentially large data transfers such as customization for a user interface (UI), sample video, still image files, language translators, and other files that are typically downloaded into the device at one of the last manufacturing processes.

By way of example and not limitation, provisioning and/or customization at 818 can include a plurality of criteria and data, such as customized ring tones, association with a particular carrier. Provisioning and customization can be determined at the consumer level or based on user customization data. For example, a consumer may be interested in loading each episode of a television program on such consumer's device. Provisioning and/or customization through the wireless systems and/or methods disclosed herein can provided such consumer with the large amount of data desired, while not affecting other devices that do not need such information. High bandwidth wireless technologies and broadcast transmission modes will not significantly increase manufacturing cycle times because of the wireless nature of the transfer.

It is to be appreciated that the disclosed systems and/or methods can be utilized after the device is in service (e.g., when the consumer is using the device). Utilizing the device's wireless technology can be incorporated into an operator or customer service center for providing efficient software upgrades while mitigating the necessity of a physical connection to the device. Other uses include targets with multiple USB ports and transferring still or motion video images out of a device wirelessly for evaluation purposes. Still other opportunities include transferring large data during other test processes. There can also be a separate data I/O boot load from wireless flash download.

Figure 9:
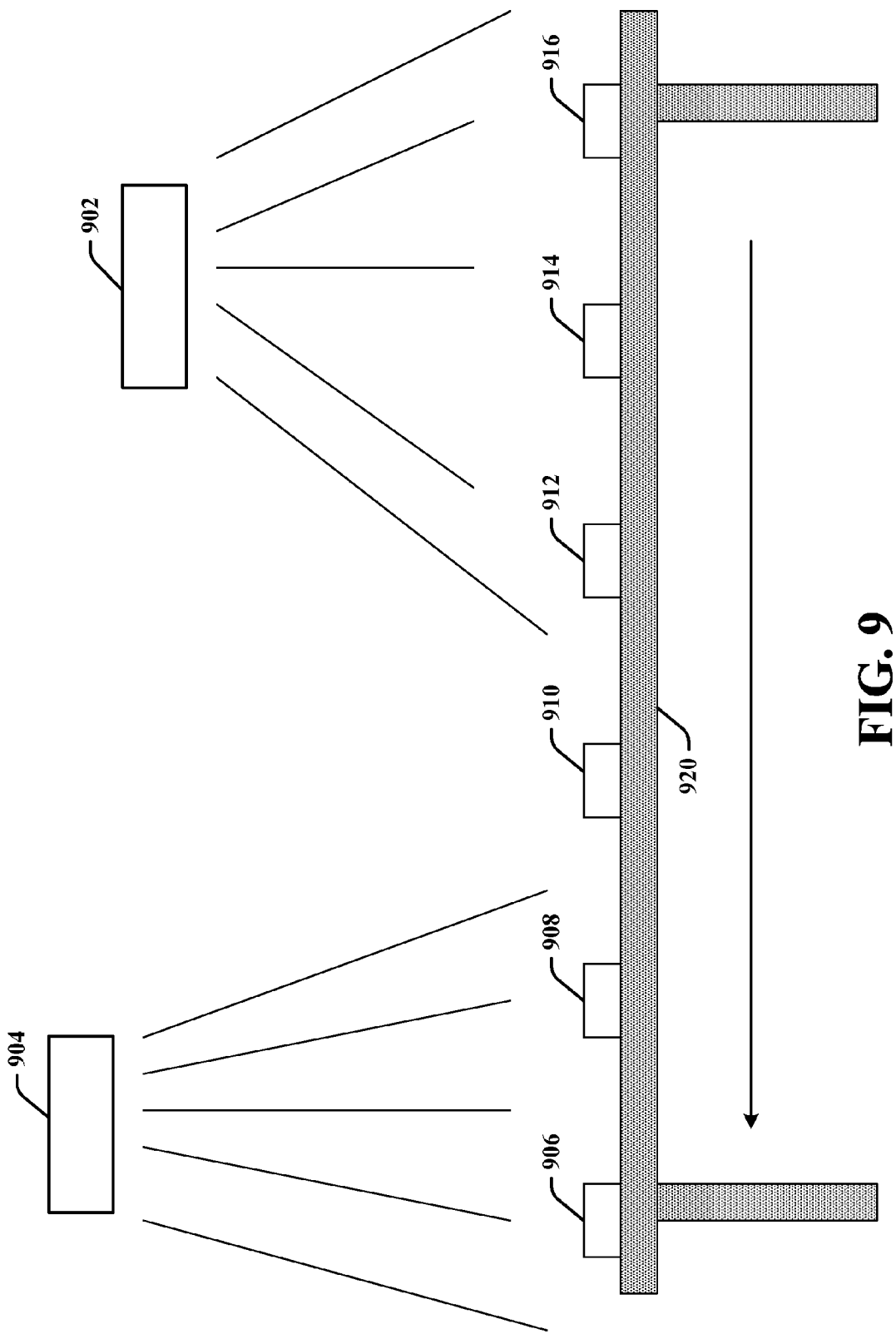
FIG. 9 illustrates an exemplary representation of the disclosed systems and/or methods utilized in a manufacturing environment.

FIG. 9 illustrates an exemplary representation of the disclosed systems and/or methods utilized in a manufacturing environment. Two tester/controller devices 902 and 904 can be located in different areas of a facility. It is to be understood that the tester/controller devices 902 and 904 can be located in separate departments, rooms, or areas. Alternatively or in addition, one tester/controller can be utilized provided there is a sufficient means for distinguishing and/or interfacing with a plurality of wireless devices in a manufacturing environment. For example, a tester/controller device 902 can be located and configured to broadcast or communicate information in certain predefined manufacturing stages (e.g., flash, RF calibration, call test, MMI (UI), audio test, antenna test, provisioning and customization, . . . ). As illustrated, wireless devices 906, 908, 910, 912, 914, 916 can be transported, such as on a conveyor belt 920 through one or more manufacturing processes in the direction of the arrow.

A tester/controller device 902 transmits a signal and wireless devices 906, 908, 910, 912, 914, 916 in the vicinity or range of the tester/controller device 902 receive and respond to the signal. As illustrated, wireless devices 912, 914, 916 are within the range of tester/controller device 902 and wireless devices 906 and 908 are within the range of tester/controller device 904. Wireless device 910 is not within the range or either tester/controller device 902 or 904 and, therefore, does not receive or respond to signals transmitted by either tester/controller device 902 or 904.

When a particular wireless device 906, 908, 910, 912, 914, 916 responds to a signal received from the tester/controller 902 or 904, the location of such device 906, 908, 910, 912, 914, 916 can be determined based upon such response. For example, when tester/controller device 904 receives a response from wireless device 914, it recognizes the wireless device 914 based upon a unique identifier assigned to the device. This unique identifier can be assigned to the device at a preliminary manufacturing stage, such as a flash stage, for example.

It is to be appreciated that as devices 906, 908, 910, 912, 914, 916 move into and out of the range of a particular tester/controller device 902 or 904 programming, testing, configuration, etc. of each device 906, 908, 910, 912, 914, 916 is automatically initiated and concluded. When a device enters a certain range or distance from a controller, it automatically sinks up with the controller and the process initiates automatically. In such a manner, intervention of manual labor is mitigated and the process becomes automated, allowing the product to flow virtually autonomously.

Figure 10:
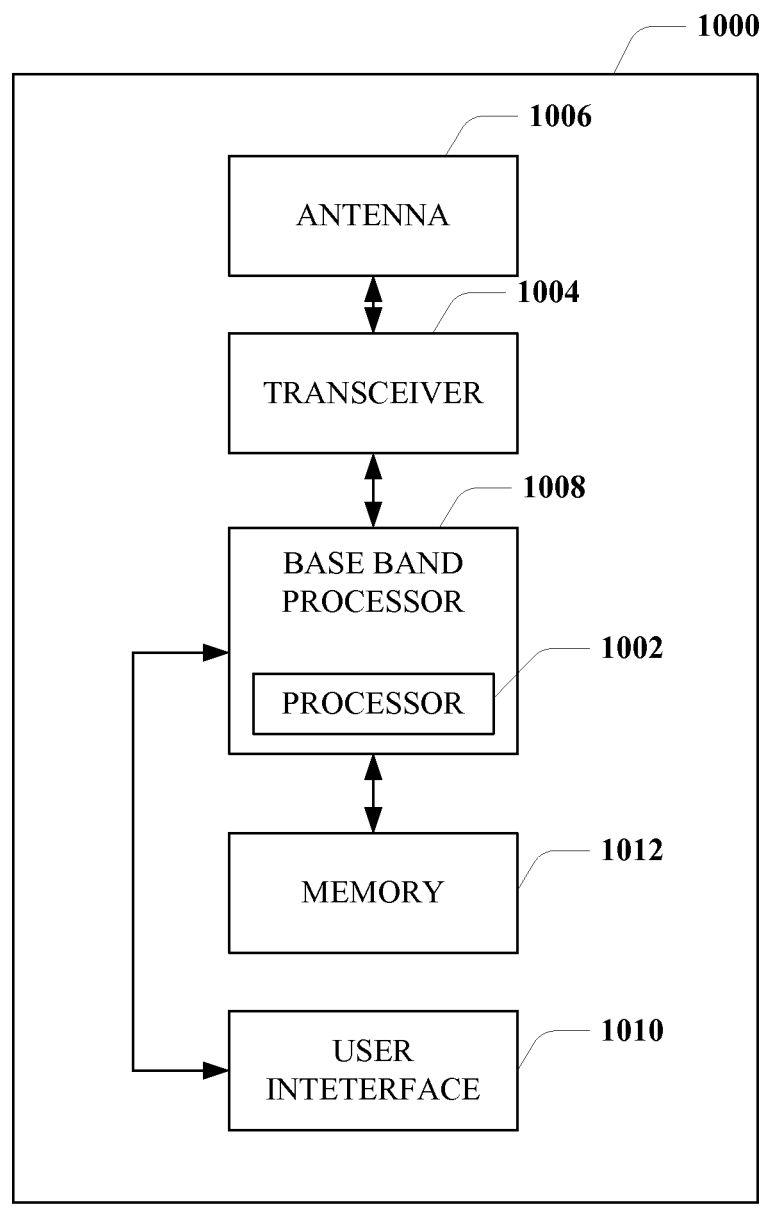
FIG. 10 illustrates a conceptual block diagram of a configuration of a wireless device or terminal.

With reference now to FIG. 10, illustrated is a conceptual block diagram of a possible configuration of a wireless device or terminal 1000. As those skilled in the art will appreciate, the precise configuration of the terminal 1000 may vary depending on the specific application and the overall design constraints. Processor 1002 can implement the systems and methods disclosed herein.

Terminal 1000 can be implemented with a front end transceiver 1004 coupled to an antenna 1006. The front end transceiver 1004 is configured to receive program and/or test data during a manufacturing, testing, or programming process. A base band processor 1008 can be coupled to the transceiver 1004. The base band processor 1008 can be implemented with a software based architecture, or other types of architecture. A microprocessor can be utilized as a platform to run software programs that, among other functions, provide control and overall system management function. A digital signal processor (DSP) can be implemented with an embedded communications software layer, which runs application specific algorithms to reduce the processing demands on the microprocessor. The DSP can be utilized to provide various signal processing functions such as pilot signal acquisition, time synchronization, frequency tracking, spread-spectrum processing, modulation and demodulation functions, and forward error correction.

Terminal 1000 can also include various user interfaces 1010 coupled to the base band processor 1008. User interfaces 1010 can include a keypad, mouse, touch screen, display, ringer, vibrator, audio speaker, microphone, camera, and/or other input/output devices.

The base band processor 1008 comprises a processor 1002. In a software based implementation of the base band processor 1008, the processor 1002 may be a software program running on a microprocessor. However, as those skilled in the art will readily appreciate, the processor 1002 is not limited to this embodiment, and may be implemented by any means known in the art, including any hardware configuration, software configuration, or combination thereof, which is capable of performing the various functions described herein. The processor 1002 can be coupled to memory 1012 for the storage of data. The memory 1012 is configured to store the program data received during a manufacturing and/or test process and the processor 1002 or 1008 is configured to be programmed with the program data.

Figure 11:
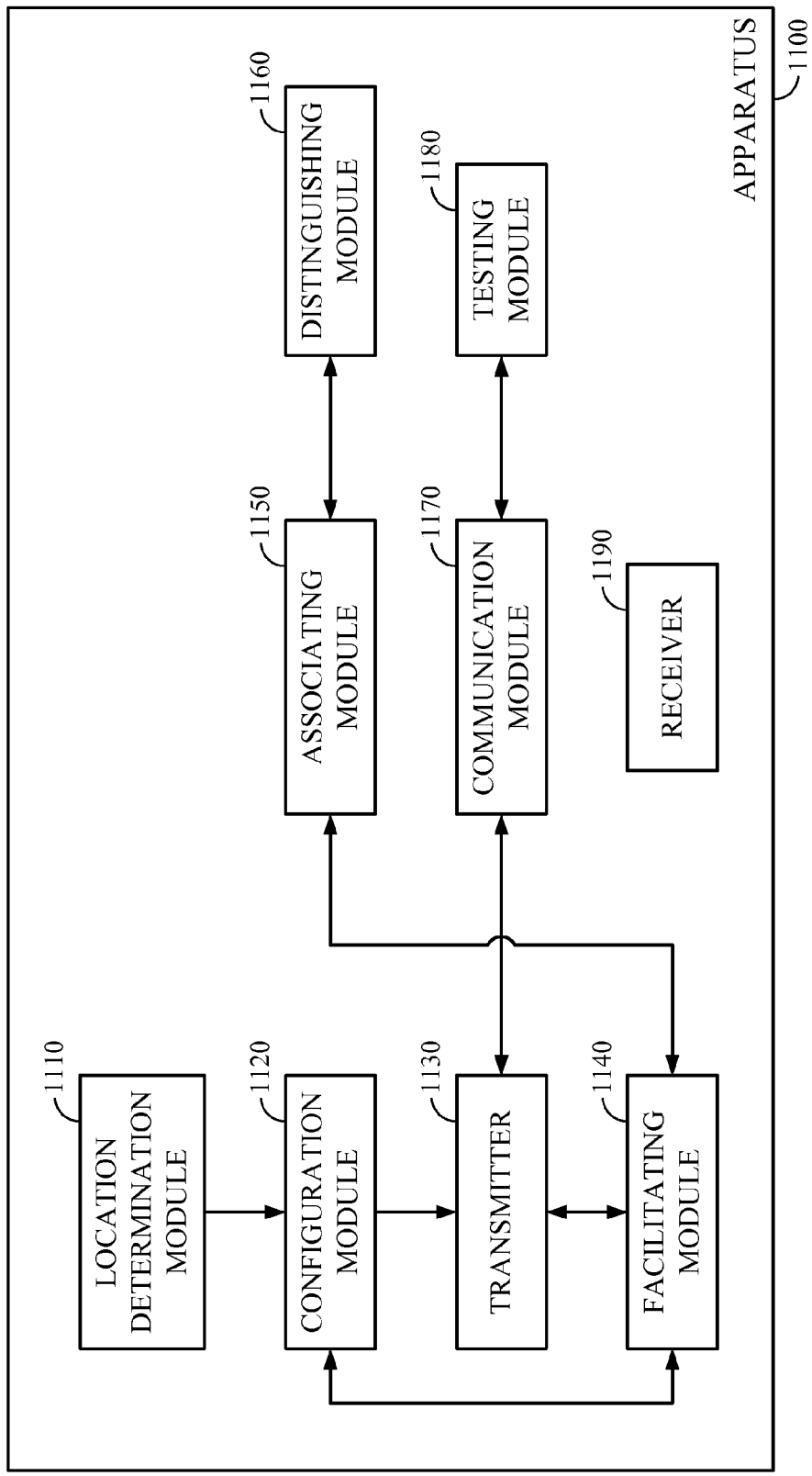
FIG. 11 illustrates an example implementation of another apparatus.

FIG. 11 illustrates another example implementation of an apparatus 1100 for use in programming wireless devices during manufacturing or testing as described above. Apparatus 1100 comprises a location determination module 1110, a configuration module 1120, a transmitter 1130 and a facilitating module 1140. Location determination module 1110 is configured to determine the location information for a plurality of wireless devices. Configuration module 1120 is configured to configure the program data based at least in part on the determined location. Transmitter 1130 is configured to wirelessly transmit the program data to the plurality of wireless devices. Finally, facilitating module 1140 is configured to facilitate concurrent programming of the plurality of wireless devices with the program data.

Apparatus 1100 may also comprise an associating module 1150 configured to concurrently associate each of the plurality of wireless devices with an identifier and a distinguishing module 1160 configured to distinguish the plurality of wireless devices based at least in part on the identifier. Apparatus 110 may further comprise a communication module 1170 configured to communicate a test program wirelessly to the plurality of wireless devices, and a testing module 1180 configured to concurrently testing the plurality of wireless devices with the communicated test program. A receiver 1190 may also be included and configured to receive a test result from each of the plurality of wireless devices, the test result includes identification information.

It should be understood that apparatus 1100 is an example. Accordingly, apparatus 1100 may comprise additional elements such as, but not limited to, a general processor and/or a storage medium. On the other hand, some of the elements of apparatus 1100 may be removed without affecting the operations of the apparatus. Moreover, one or more of the elements of apparatus 1100 may be rearranged and/or combined and still achieve the operations of apparatus as described above.

Therefore, it is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

What has been described above includes examples of one or more embodiments. It is, of course, not possible to describe every conceivable combination of components or methodologies for purposes of describing these embodiments, but one of ordinary skill in the art may recognize that many further combinations and permutations of such embodiments are possible. Accordingly, the embodiments described herein are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A method of programming wireless devices in a manufacturing environment, comprising:
sending program data to at least one wireless device though a wireless communication during a manufacturing or testing process;
retrieving a before-event last known location of the at least one wireless device when an event disrupting a device process flow is over, wherein the before-event last known location is a last recorded location for the at least one wireless device before the disrupting event;
comparing the before-event last known location of the at least one wireless device with an after-event location of the at least one wireless device, wherein the after-event last known location is a first record location for the at least one wireless device after the disrupting event;
returning the at least one wireless device to the before-event last known location when there is a difference between the before-event last known location and the after-event location as a result of the comparing;
determining whether the at least one wireless device has successfully completed the programming at the before-event last known location after returning the at least one wireless device to the before-event last known location when there is a difference between the before-event last known location and the after-event location; and
programming the at least one wireless device with the program data if the at least one wireless device has not successfully completed the programming.

2. The method of claim 1, the wireless communication is one of Bluetooth, WiFi, Wireless USB, Code-Division Multiple Access (CDMA), wide-band CDMA (WCDMA), Global Systems for Mobile Communication (GSM), enhanced data GSM environment (EDGE), WiMAX or IEEE 802.16 standard, and Global Positioning System (GPS) format.

3. The method of claim 1, further comprising:
concurrently receiving the program data at a plurality of other wireless devices at a substantially similar time as the at least one wireless device; and
concurrently programming the plurality of other wireless devices.

4. The method of claim 3, further comprising:
distinguishing among the plurality of other wireless devices based at least in part on a unique identifier; and
configuring the sent program data based at least in part on the unique identifier.

5. The method of claim 1, before the act of sending program data to at least one wireless device though a wireless communication, further comprising:
determining a first location of the at least one wireless device; and
configuring the program data based at least in part on the first location.

6. The method of claim 3 further comprising:
determining a second location of the at least one wireless device;
extracting data from the at least one wireless device at the second location; and
comparing the extracted data with the program data configured at the first location.

7. The method of claim 6, further comprising:
returning the at least one wireless device to the first location if the extracted data does not match the program data configured at the first location.

8. The method of claim 6, further comprising:
processing the at least one wireless device at the second location if the extracted data matches the program data configured at the first location.

9. A method of testing a wireless computing device, comprising:
locating the wireless computing device in a manufacturing process;
sending a wireless test signal to the wireless computing device;
retrieving a before-event last known location of the wireless computing device when an event disrupting a device process flow is over, wherein the before-event last known location is a last recorded location of the wireless computing device before the disrupting event;
comparing the before-event last known location of the wireless computing device with an after-event location of the wireless computing device, wherein the after-event last known location is a first record location of the wireless computing device after the disrupting event;
returning the wireless computing device to the before-event last known location when there is a difference between the before-event last known location and the after-event location as a result of the comparing;
determining whether the wireless computing device has successfully completed the testing at the before-event last know location after returning the wireless computing device to the before-event last known location when there is a difference between the before-event last known location and the after-event location; and
processing the wireless test signal at the plurality of the wireless computing device when the wireless computing device has not successfully completed the testing.

10. The method of claim 9, further comprising:
testing the a plurality of wireless computing devices as a batch of devices.

11. The method of claim 9, further comprising:
assigning a unique identifier to the wireless computing device; and
distinguishing the wireless device from among a plurality of wireless devices based at least in part on the wireless device's assigned unique identifier.

12. The method of claim 9, wherein the act of locating the wireless computing device in a manufacturing process further comprising:
determining where each of a plurality of wireless computing devices is located based upon a manufacturing process; and grouping a subset of the plurality of wireless computing devices using the determined locations.

13. The method of claim 9, further comprising:
beginning a data communication automatically when the wireless computing device enters a signal range; and
ending a data communication automatically when the wireless computing device exits a signal range.

14. The method of claim 13, wherein the data communication is one of a test procedure and a data transfer.

15. The method of claim 9, wherein the wireless test signal is one of Bluetooth, WiFi, Wireless USB, Code-Division Multiple Access (CDMA), wide-band CDMA (WCDMA), Global Systems for Mobile Communication (GSM), enhanced data GSM environment (EDGE), WiMAX or IEEE 802.16 standard, and Global Positioning System (GPS) format.

16. A method for facilitating wireless testing and programming of wireless devices; comprising:
establishing communication between at least one control unit and at least one wireless device;
receiving information at the at least one wireless device from the at least one control unit;
transmitting response information to the at least one control unit from the at least one wireless device;
retrieving a before-event last known location of the at least one wireless device when an event disrupting a device process flow is over, wherein the before-event last known location is a last recorded location for the at least one wireless device before the disrupting event;
comparing the before-event last known location of the at least one wireless device with an after-event location of the at least one wireless device, wherein the after-event last known location is a first record location for the at least one wireless device after the disrupting event;
returning the at least one wireless device to the before-event last known location when there is a difference between the before-event last known location and the after-event location as a result of the comparing;
determining whether the at least one wireless device has successfully completed the testing and programming at the before-event last know location after returning the at least one wireless device to the before-event last known location when there is a difference between the before-event last known location and the after-event location; and
facilitating the testing and programming the at least one wireless device during at least one manufacturing process if the at least one wireless device has not successfully completed the testing and programming.

17. The method of claim 16, further comprising:
updating a processor of the wireless device with the received information; and
storing the received information in a memory of the wireless device.

18. The method of claim 16, further comprising:
determining a location of the at least one wireless device;
performing a wireless test of the at least one wireless device; and
receiving a signal from the at least one wireless device that contains test result information.

19. The method of claim 18, further comprising:
sending a wireless test signal to a plurality of wireless devices at a similar time;
processing the wireless test signal at the plurality of wireless devices in parallel; and
receiving respective test result signals from each of the plurality of wireless devices.

20. The method of claim 19, the plurality of wireless devices are in different manufacturing areas.

21. A manufacturing system comprising:
at least one control unit configured to:
send program data to a wireless device though a wireless communication during a manufacturing or testing process;
retrieve a before-event last known location of the wireless device when an event disrupting a device process flow is over, wherein the before-event last known location is a last recorded location for the wireless device before the disrupting event;
compare the before-event last known location of the wireless device with an after-event location of the wireless device, wherein the after-event last known location is a first record location for the wireless device after the disrupting event;
facilitate the return of the wireless device to the before-event last known locations when there is a difference between the before-event last known location and the after-event location as a result of the comparing;
determine whether the wireless device has successfully completed the programming at the before-event last know location after returning the wireless device to the before-event last known location when there is a difference between the before-event last known location and the after-event location; and
program the wireless device with the program data during at least one manufacturing process if the wireless device has not successfully completed the programming,
wherein the at least one control unit interfaces wirelessly with the wireless device during the at least one manufacturing process.

22. The system of claim 21, wherein the wireless device and the at least one control unit communicate in a format supported by an embedded wireless technology of the wireless device.

23. The system of claim 21, the at least one control unit and the wireless device communicate wirelessly utilizing one of Bluetooth, WiFi, Wireless USB, Code-Division Multiple Access (CDMA), wide-band CDMA (WCDMA), Global Systems for Mobile Communication (GSM), enhanced data GSM environment (EDGE), WiMAX or IEEE 802.16 standard, and Global Positioning System (GPS) format.

24. The system of claim 21, the at least one manufacturing process is one of a flash, RF calibration, call test, MMI test, audio test, antenna test and provisioning and customization.

25. The system of claim 21, the wireless interface is one of a data transfer, a test procedure, and a customization file.

26. The system of claim 21, the wireless device is assigned a unique identifier that identifies a particular wireless device.

27. The manufacturing system of claim 21, wherein the wireless device is one of a plurality of wireless devices processed in a batch.

28. A system that programs a wireless device during manufacturing or testing, comprising:
means for determining location information for the wireless device;
means for configuring program data using the determined location;
means for wirelessly transmitting the program data to the wireless device;
means for retrieving before-event last known locations of the wireless device when an event disrupting a device process flow is over, wherein the before-event last known location is a last recorded location for the wireless device before the disrupting event;

means for comparing the before-event last known location of the wireless device with after-event location of the wireless device, wherein the after-event last known location is a first record location for the wireless device after the disrupting event;

means for facilitating the return of the wireless device to the before-event last known location if there is a difference between the before-event last known location and the after-event location as a result of the comparing;

means for determining whether the wireless device has successfully completed the programming at the before-event last known location after facilitating the return of the wireless device to the before-event last known location when there is a difference between the before-event last known location and the after-event location; and means for facilitating the programming of the wireless device with the program data if the wireless device has not successfully completed the programming.

29. The system of claim 28, further comprising:

means for concurrently associating each of a plurality of wireless devices with an identifier, wherein the plurality of wireless devices comprises the wireless device; and means for distinguishing the wireless device from the plurality of wireless devices based at least in part on the identifier.

30. The system of claim 28, further comprising:

means for communicating a test program wirelessly to a plurality of wireless devices; and means for concurrently testing the plurality of wireless devices with the communicated test program.

31. The system of claim 30, further comprising:

means for receiving a test result from each of the plurality of wireless devices, wherein the test result includes identification information.

32. The system of claim 28, wherein the wireless device is one of a plurality of wireless devices processed in a batch.

* * * * *